United States Patent [19]
Van Rhyn

[11] Patent Number: 5,486,670
[45] Date of Patent: Jan. 23, 1996

[54] PILOT PROBE FOR ORBITAL WELDING APPARATUS

[75] Inventor: Lucas H. Van Rhyn, Dansville, N.Y.

[73] Assignee: Foster Wheeler Energy Corporation, Clinton, N.J.

[21] Appl. No.: 265,485

[22] Filed: Jun. 24, 1994

[51] Int. Cl.⁶ ................................................ B23K 9/028
[52] U.S. Cl. ........................................................ 219/60.2
[58] Field of Search .......................... 219/60 A, 60.2, 219/61, 121.63

[56] References Cited

U.S. PATENT DOCUMENTS

| | | | |
|---|---|---|---|
| 3,783,230 | 1/1974 | Peyrot | 219/121.63 |
| 4,142,084 | 2/1979 | Torrani | 219/60 A |
| 4,427,868 | 1/1984 | Kazlauskas | 219/60.2 |
| 4,476,367 | 10/1984 | Kazlauskas | 219/60.2 |
| 5,239,154 | 8/1993 | Puls | 219/60.2 |

*Primary Examiner*—Clifford C. Shaw
*Attorney, Agent, or Firm*—Marvin A. Naigur

[57] ABSTRACT

An orbital type welding apparatus adapted for use in welding tubes into a tubesheet by an inert gas electric arc welding process. The welding apparatus includes a housing, a rotor rotatably mounted within the housing, and a pilot probe unit extending from the housing lower side. The pilot probe unit contains a plurality of resiliently-mounted convex projections such as balls, which are spaced apart both circumferentially and longitudinally with respect to the pilot probe unit. The balls are mounted in transverse openings in the pilot unit. The spring-loaded projections serve to center the pilot unit and welding apparatus more quickly and accurately within a tube being electric arc welded to a tubesheet. Alternatively, a pilot probe unit having a plurality of transverse grooves can be used for welding tubes which are essentially round.

7 Claims, 5 Drawing Sheets

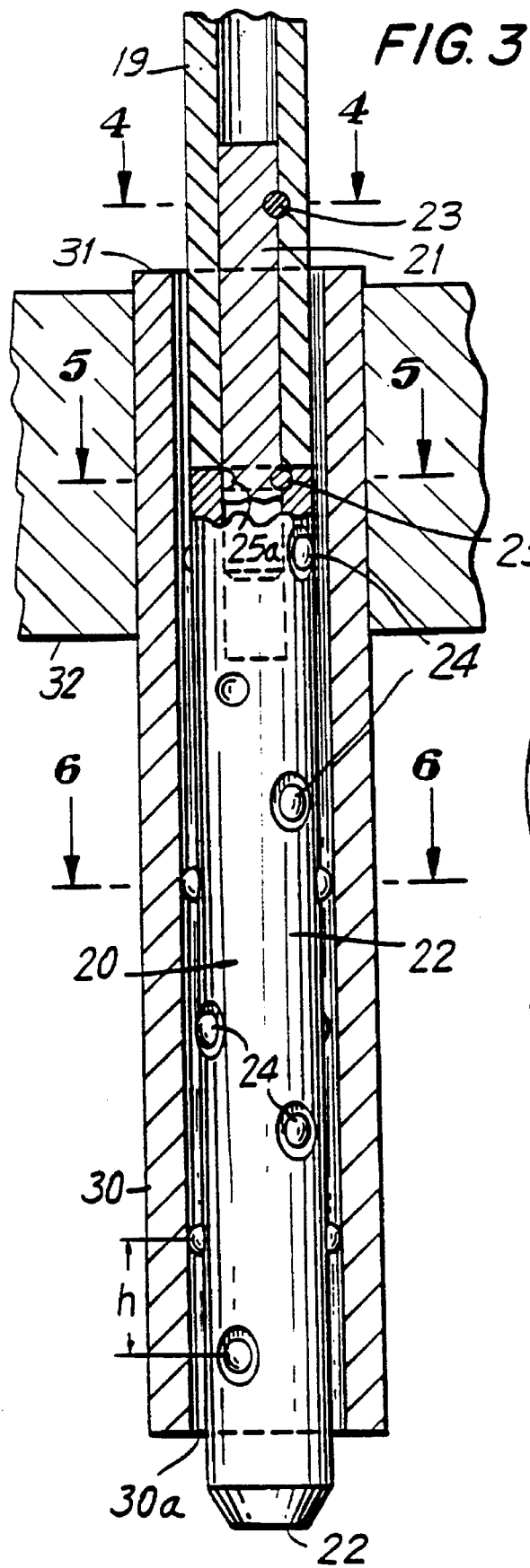
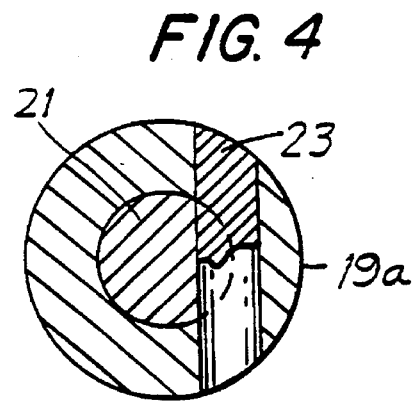
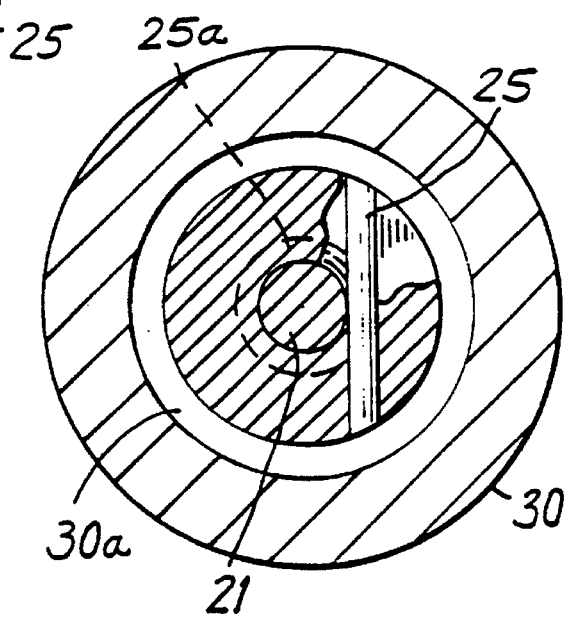
FIG. 3
FIG. 4
FIG. 5

PILOT PROBE FOR ORBITAL WELDING APPARATUS

BACKGROUND OF THE INVENTION

This invention pertains to welding apparatus adapted for welding tubes into a tubesheet. It pertains particularly to an orbital type such welding apparatus having an improved pilot probe unit containing grooves or spring-loaded projections for locating a welding torch precisely relative to a tube being welded leak-tightly into a tubesheet.

Multiple tubes are welded into tubesheets in many types of pressurizable tubular heat exchange equipment, including steam condensers, intercoolers, and other similar heat exchangers which require that tubes having ends inserted into a tubesheet be reliably seam welded to the tubesheet. Such welding operations require that the welding electrode be precisely located above the tube end so as to produce leaktight welded joints. Various welding equipment has been developed for accomplishing such welding operations, such as that disclosed by U.S. Pat. No. 2,908,805 to Apblett et al; U.S. Pat. No. 3,754,115 to Roberts et al; U.S. Pat. No. 3,946,191 to Graham; U.S. Pat. No. 4,004,125 to Hood et al; U.S. Pat. No. 4,327,269 to Glatthorn; and U.S. Pat. Nos. 4,427,868 and 4,476,367 to Kazlauskas. Although these prior patents have disclosed various welding torch configurations which have pilot members which have been found useful for welding the ends of tubes into tubesheets, various disadvantages and misalignment problems with such welding apparatus have persisted. These deficiencies have now been successfully overcome by the present invention.

SUMMARY OF THE INVENTION

The invention provides an improved orbital welding apparatus or torch specially adapted for rapidly welding tube ends into a tubesheet. The apparatus provides for precise location of the torch electrode relative to the tube end during such welding operations.

The invention includes an orbital welding torch body containing a rotor unit, a welding electrode attached to the rotor unit and being adapted for making successive GTA (gas tungsten arc) welds of tubes into a tubesheet, and a pilot-probe unit extending downwardly from the lower side of the torch body and being adapted for insertion into a tube-to-be-welded to locate and accurately align the torch body and welding electrode relative to the tube-to-be-welded.

The pilot probe unit is generally cylindrical shaped and is provided with a plurality of resiliently-mounted convex lateral projections such as spring-loaded balls, which are spaced apart both circumferentially and longitudinally from adjacent projections or balls in the probe unit. Such resiliently-mounted projections serve to automatically center the pilot probe unit within a tube-to-be-welded even if the tube is not entirely round. Such convex lateral projections may be resiliently-mounted in opposite pairs by a compression spring located in transverse openings provided in the pilot probe unit. The convex surfaces or balls each extend radially outwardly from the pilot probe outer surface by at least 0.008 inch, and preferably by 0.012–0.060 inches.

In operation, the pilot probe unit containing a plurality of resiliently mounted convex projections or balls is inserted manually into a tube-to-be-welded into a tubesheet, so that the resiliently-mounted surfaces firmly contact the inner surface of the tube. The pilot probe unit is thereby accurately centered within the tube by action of the resiliently mounted convex surfaces. Such centering is accomplished prior to welding the tube end to the tubesheet. Through the action of the springs, the pilot-probe apparatus accommodates variations in the tube inner surface. The torch apparatus rotor mechanism is then actuated, and the welding electrode is rotated relative to the torch body and produces a metal arc weld between the tube end and the tubesheet.

In an alternative embodiment, the pilot probe unit may be a solid cylinder having a plurality of transverse grooves. Furthermore, although the invention is shown and described with reference to simple fusion welding, it may be used for fillet welding with welding wire addition.

This invention is useful on welding machines that commonly weld metal tubes having outside diameters of about 0.50 to 1.0 inches into tubesheets. The invention is useful for arc welding tubing made of brass, copper, carbon steel, stainless steel, and titanium alloy into tubesheets.

The present invention advantageously provides an improved orbital type welding apparatus containing a pilot probe unit which produces more accurate alignment for the gas shielded electrode of welding torches, and results in making more rapid and reliable welds of tubes into tubesheets.

BRIEF DESCRIPTION OF THE DRAWINGS

This invention will be described by reference to the following drawings, in which:

FIG. 3 is a partial cross-sectional elevational view taken at line 3—3 of FIG. 2, showing the pilot probe unit inserted and centered in a tube;

FIGS. 4, 5, and 6 are each cross-sectional views of the pilot probe unit taken at lines 4—4, 5—5, and 6—6, respectively, of FIG. 3.

DESCRIPTION OF INVENTION

Figure 1:
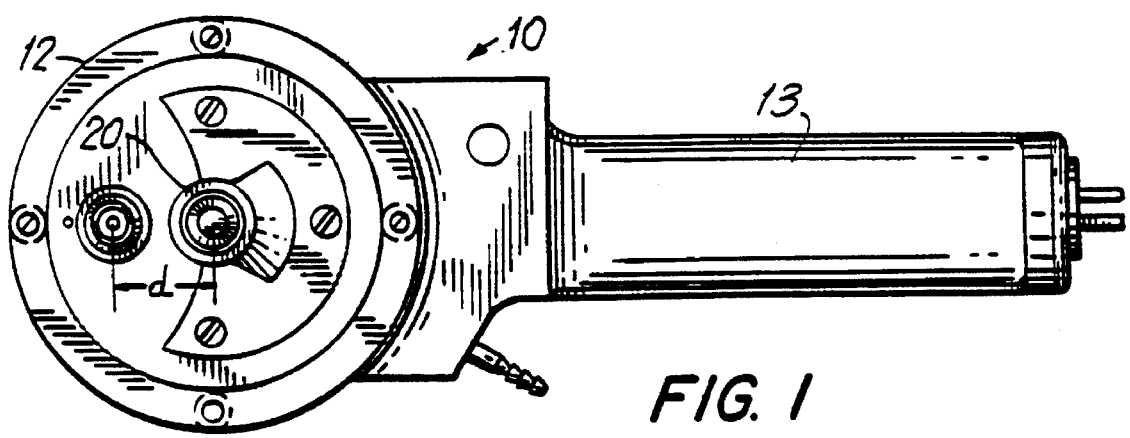
FIG. 1 is a plan view showing the bottom side of an orbital type tube welding apparatus arranged according to the invention.
Figure 2:
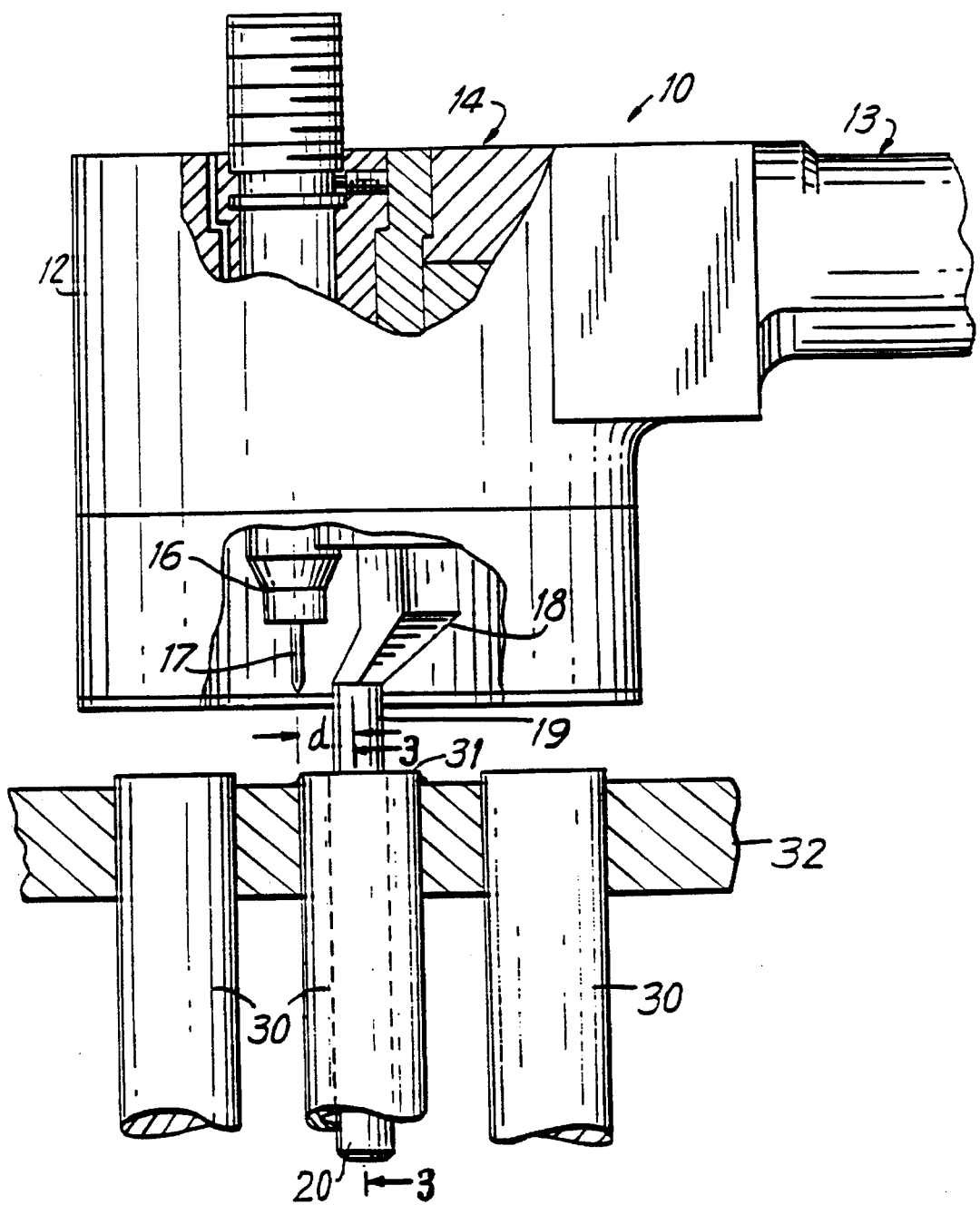
FIG. 2 is a vertical view, partly in section, showing an orbital type welder having a pilot probe unit inserted into a tube with the torch electrode raised above its operative position for welding the tube.

As is generally shown by FIGS. 1 and 2, a welding torch assembly 10 includes a body unit 12 having a handle 13, and internal rotor 14, a welding head unit 16 containing a gas-shielded tungsten electrode 17, and a pilot probe unit 20 extending downwardly from the lower side of the body unit 12. The pilot probe unit 20 is attached to the torch rotor 14 by a locater arm 18, which has a lower portion 19 that is offset from the locator arm 18, so as to provide a horizontal distance (d) between the electrode 17 and the center of the offset portion 19 and pilot probe unit 20. The distance (d) is substantially equal to the outside radius of a tube 30 to be welded into a tubesheet 32 plus a typical weld site offset of, for example, ten thousandths (0.010) of an inch. The rotor and electrode units of the welding apparatus are described in greater detail in U.S. Pat. No. 3,946,191, which is incorporated herein by reference to the extent necessary for providing a complete description of this invention.

When the pilot probe unit 20 is inserted into one of a plurality of tubes 30 which are to be arc welded into tubesheet 32, the electrode 17 of torch unit 16 will travel around the circumference of the tube end 31 so as to weld it pressure-tightly into the tubesheet 32.

Referring now to FIG. 3, which shows the pilot probe unit 20 and tube 30 in greater detail, an elongated mandrel 22 is attached to extension 19 of torch locater arm 18 by means of a central connecting rod 21 having an upper cross-pin 23 inserted into a transverse hole which intersects the arm extension 19 and central connecting rod 21. The central rod 21 is inserted into and rotatably attached to the upper end of elongated mandrel 22 by a lower transverse pin 25 which fits into a circular groove 25a in rod 21.

FIG. 4 shows an enlarged cross-sectional view of the construction used for securely and removably attaching the central connecting rod 21 into arm extension 19, and FIG. 5 shows the construction for attaching the elongated outer mandrel 22 to the central connecting rod 21 and to welding torch assembly 10. Such attachment means permits removal of the pilot probe unit 20 from the welding apparatus 10 whenever needed. In the alternative, pins 23 and 25, and groove 25a, may be combined at the illustrated location of pin 23, and the central connecting rod 21 may be made unitary with mandrel 22.

The elongated mandrel 22 is provided with a plurality of convex resiliently-mounted projections or balls 24, which are substantially uniformly spaced apart along the surface of the mandrel. These balls are preferably provided in diametrically opposed sets, with the resiliently-mounted balls or projections in each set being spring-loaded by a compression spring 26 set in a transverse opening 27. Each transverse opening 27 has a smaller diameter portion 27a sized to retain the ball 24, so that the balls each extend radially outwardly from the outer surface of mandrel 22 by 0.008–0.060 inches. The balls each press outwardly against the inner wall of tube 30 across a radial clearance space 30a between the outer surface of mandrel 22 and the inner wall of tube 30, thereby providing for the pilot probe unit 20 to be centrally located with the tube 30 being welded into tubesheet 32. Preferably, the spring loaded balls 24 are substantially evenly spaced apart both circumferentially and longitudinally in the mandrel 22.

Figure 6:
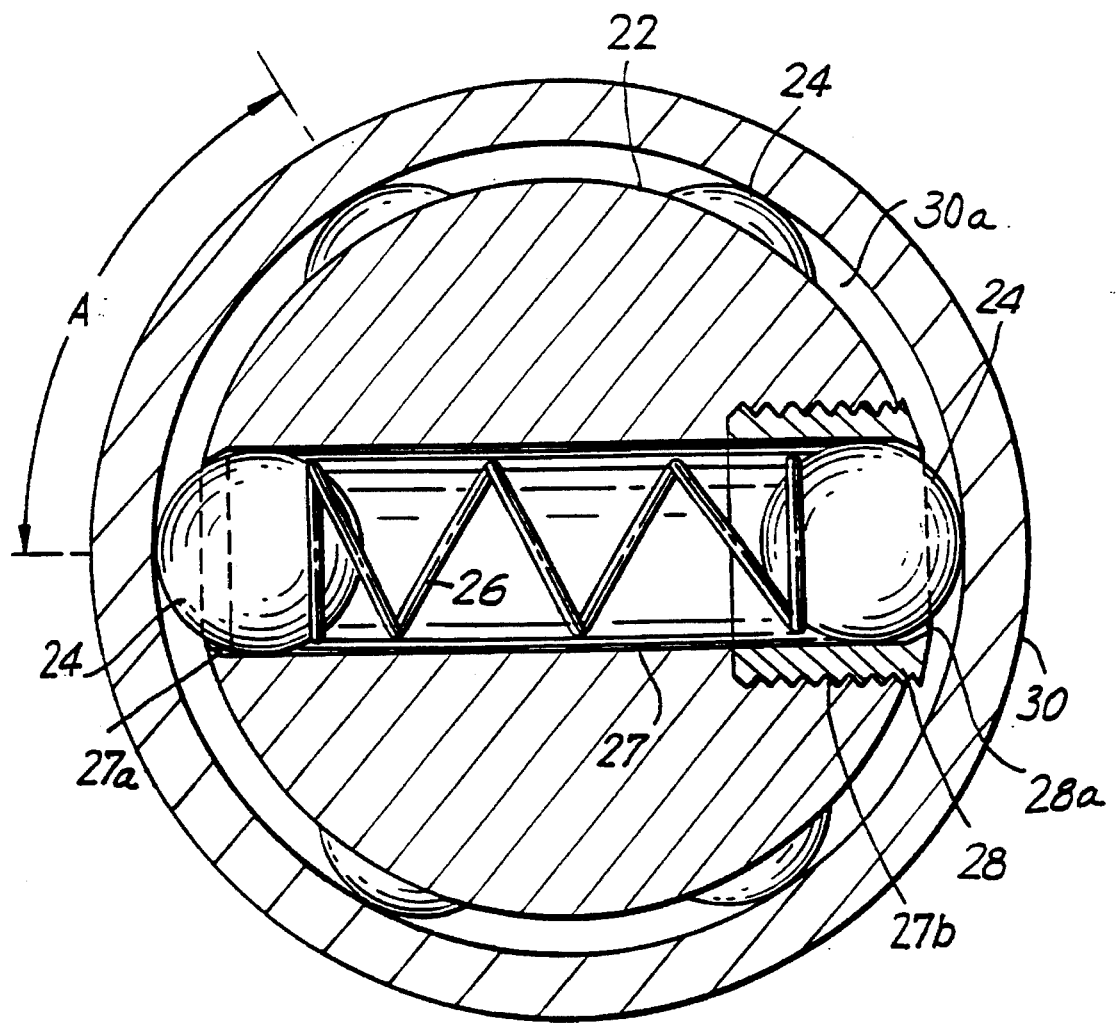

As shown in FIG. 6, one ball 24 of each set is preferably located in a small diameter portion 27a diametrically opposite an annular shaped externally threaded member 28, which is threaded into an enlarged portion 27b at the other end of transverse opening 27. Threaded member 28 is provided with a similar diameter portion 28a sized so as to retain its own ball 24.

The sets of two spring-loaded balls 24 and threaded member 28 are spaced apart longitudinally along the mandrel 22 by a distance which may advantageously be in a range between about 0.5 and 4.0 times the outside diameter of the mandrel. At least four and preferably six to eight sets of spring-loaded balls longitudinally spaced apart are used in mandrel 22 of pilot probe unit 20, with adjacent sets of balls having central axes that are angled from each other by an angle A of at least 30 degrees, and preferably 45–90 degrees.

The mandrel 22 is usually made of metal having good heat conduction and machinability characteristics, such as brass. Balls 24 are usually made of hardened steel for good wear resistance. For the compression springs 26, the spring rates are selected so as to permit ease of insertion of the probe into a tube to be welded, i.e. springs 26 not too stiff, and providing adequate stability of the probe unit 20 in the tube 30, i.e. springs 26 not too weak. The compression springs 26 are preferably made of a heat-resistant material such as stainless steel. Whenever it is desired to make seam welds between a tube 30 and a surrounding tubesheet 32, the pilot probe unit 20 of welder apparatus 10 is inserted manually into the tube 30, and the apparatus 10 is lowered until it contacts the work. The tube 30 has an inner diameter which is 0.020–0.040 inch greater than the outside diameter of mandrel 22, so that the action of the multiple spring-loaded balls 24 centers the pilot probe unit 20 in the tube 30 being welded, even though the inside of the tube may not be perfectly round. The pilot probe 20 thereby provides for the electrode 17 to be accurately aligned with the end 31 of tube 30, even if the tube is somewhat out-of-round or otherwise dimensionally irregular. The welding torch assembly 10 is then operated by providing inert gas shielding for the electrode 17, striking an electric arc between the electrode 17 tip end and tube end 31, then moving the welding head unit 16 in a circular orbit around the pilot probe unit 20 so as to melt the tube end 31 and weld it onto the tubesheet 32.

Figure 7:
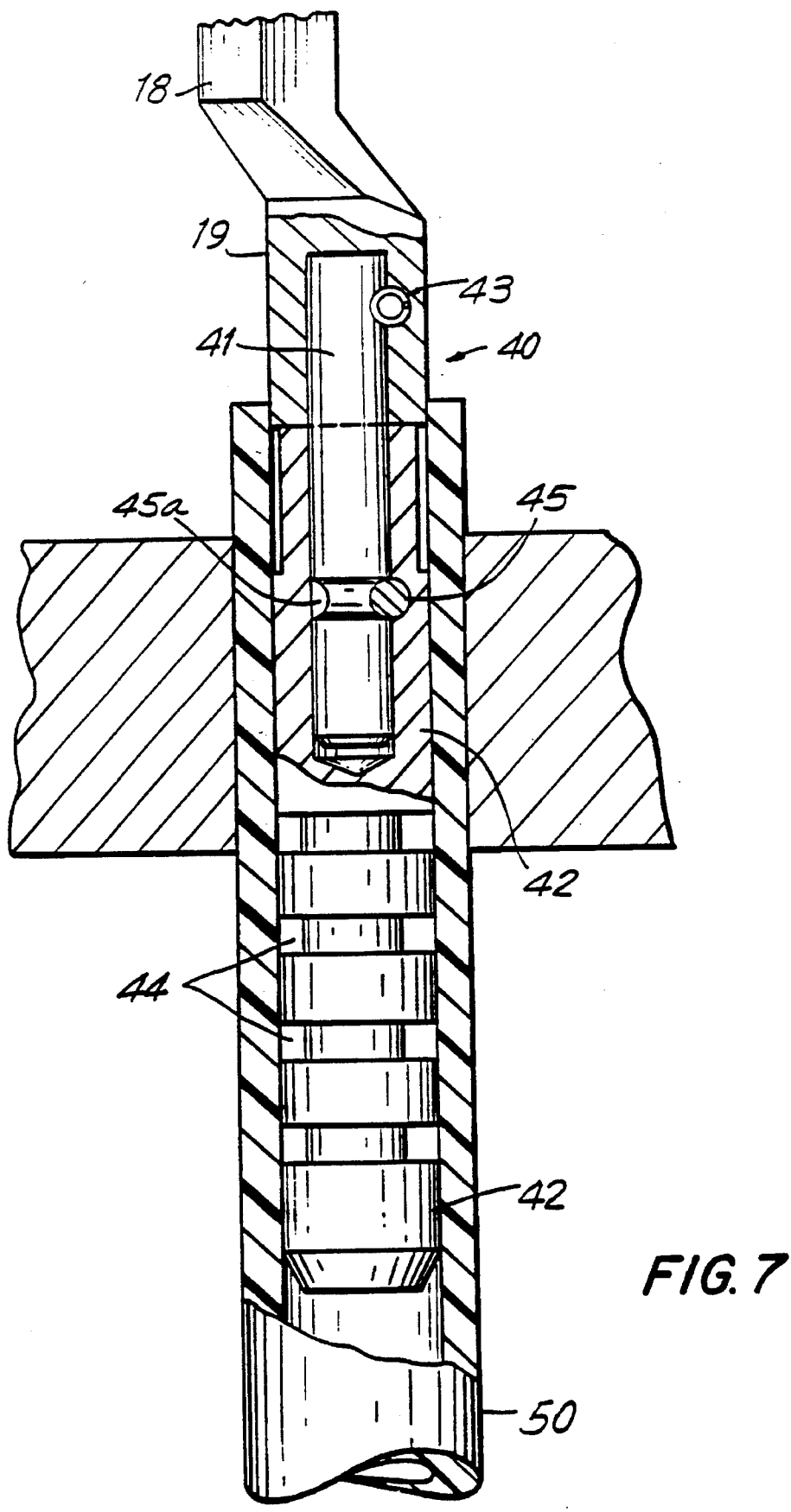
FIG. 7 is an elevation view, partly in cross-section, showing a second embodiment of a pilot probe disposed in a tube-to-be-welded to a tubesheet.

In an alternative embodiment of the invention, the pilot probe unit may be provided with a plurality of transverse grooves, as is shown in FIG. 7. This embodiment of the pilot probe unit is useful for tube welding applications in which the tubes to be welded are essentially round and have uniform wall thickness. The pilot probe unit 40 includes an elongated mandrel 42 which is attached to arm extension 19 by means of a central connecting rod 41 having an upper cross pin 43. The central rod 41 is also inserted into and rotatably attached to the upper end of elongated mandrel 42 by means of transverse pin 45 which fits into circular groove 45a in the rod The elongated mandrel 22 contains a plurality of transverse grooves 44, which serve to facilitate insertion of the pilot probe 40 into a tube 50 to be welded, and also advantageously reduces weight and improves air cooling of the pilot probe unit. The grooves 44 are each typically 0.12–0.15 inch wide as measured longitudinally, may be cut to a radial depth of about 0.25 inch, and are spaced apart by 0.18–0.22 inches. The difference between the diameter of mandrel 42 and the inside diameter of tube 50 should be 0.003–0.005 inches for good welding results.

This invention will be further described by the following Example, which should not be construed as limiting the scope.

EXAMPLE 1

A heat exchanger has a plurality of metal tubes inserted into a tubesheet preparatory to welding the tube ends to the tubesheet. An orbital type welding apparatus, such as Hobart Model No. 550, but having a pilot unit according to the current invention containing six sets of spring loaded balls, is inserted into one of the tubes, so that the welder electrode is closely aligned with the tube end adjacent the opening in the tubesheet. The welding apparatus is operated so that an electric arc is struck between the electrode and the tube, and a weld bead is formed circumferentially between the tube end end and tubesheet. The welding apparatus is then removed and inserted successively into adjacent tubes, and the welding operation continued. Some important exemplary characteristics of the tube and welding apparatus are provided below:

| | |
|---|---|
| Tube inside diameter, in. | 0.500 |
| Tube thickness, in. | 0.030 |
| Welder pilot probe outside diameter, in. | 0.480 |

-continued

| | |
|---|---|
| Weld site offset, in. | 0.010 |
| Welder pilot length, in. | 3 |
| Welder pilot offset dimension "d", in. | 0.290 |
| Clearance between pilot and tube, in. | 0.010–0.020 |
| Spring-loaded ball diameter, in. | 0.125 |
| Max. radial outward movement for spring-loaded balls, in. | 0.030 |
| Spring force at max. depression of balls, lb. | 4–6 |

Although this invention has been disclosed broadly and in terms of a preferred embodiment, it will be apparent that modifications and variations can be made to the invention which is defined by the following claims.

What is claimed is:

1. An orbital welding apparatus adapted for welding tubes into a tubesheet, said apparatus comprising: a body unit including a handle, a rotor unit rotatably mounted within the body unit and carrying a gas shielded type welding electrode, and a central pilot probe unit extending from said body unit lower side, said pilot probe unit having an elongated cylindrical shape and including a plurality of sets of diametrically-opposed balls longitudinally spaced apart along the pilot probe unit length, each said set including two spring-loaded balls retained in a transverse opening by an annular member having a reduced inner diameter and externally threaded transversely into the pilot probe unit, said balls each extending radially outwardly from the elongated pilot probe unit outer surface.

2. A welding apparatus according to claim 1, wherein said ball sets are spaced apart longitudinally by a distance equal to 0.5–4 times the pilot probe unit outside diameter.

3. A welding apparatus according to claim 1, wherein 4–8 sets of balls are equally spaced apart along the length of the pilot probe unit.

4. A welding apparatus according to claim 1, wherein said spring-loaded ball each extend radially outwardly from the pilot probe unit outer surface by a distance of 0.008–0.050 inch.

5. A welding apparatus according to claim 1, wherein adjacent said set of balls each have central axes which are angled from each other by 30°–90°.

6. A welding apparatus according to claim 1, wherein said pilot probe unit (20) includes an elongated mandrel (22) which is attached onto a lower extension (19) of said body unit (12) by a central connecting rod (21), said connecting rod (21) being attached to said extension (19) by an upper cross pin (23) and being connected to said mandrel (22) by a lower transverse pin (23).

7. An orbital welding apparatus adapted for welding tubes into a tubesheet, said apparatus comprising a body unit including a handle;

a rotor unit rotatably mounted within the body unit and carrying a gas shielded type welding electrode, and a central pilot probe unit extending from said body unit lower side, said pilot probe unit having an elongated cylindrical shape and including a plurality of sets of diametrically-opposed resiliently-mounted balls retained in place by an annular member having reduced inner diameter and externally threaded transversely into the pilot probe unit, said sets being spaced apart longitudinally and circumferentially along the length of the pilot probe unit, and wherein each said ball extends radially outwardly from the pilot probe outer surface by in distance of 0.008–0.050 inch, said balls being provided as 4–8 said sets with adjacent said sets being angled by 30°–90° with respect to each other.

* * * * *